United States Patent

[11] 3,558,830

[72] Inventor Warren G. Bender
Wellesley, Mass.
[21] Appl. No. 814,552
[22] Filed Apr. 9, 1969
[45] Patented Jan. 26, 1971
[73] Assignee Communication Technology Inc.
Burlington, Mass.
a corporation of Massachusetts
Continuation-in-part of application Ser. No. 777,860, Nov. 21, 1968, now abandoned.

[54] OVERVOLTAGE TRANSMISSION LINE PROTECTOR
23 Claims, 6 Drawing Figs.

[52] U.S. Cl. .......... 179/81, 179/184, 317/16
[51] Int. Cl. .......... H04m 1/00, H02h 9/00
[50] Field of Search .......... 179/81, 184, 186, 2C; 317/16

[56] References Cited
UNITED STATES PATENTS

| | | | |
|---|---|---|---|
| 3,126,452 | 3/1964 | Pettersson .......... | 317/16X |
| 3,183,309 | 5/1965 | Hunt .......... | 179/35 |
| 3,436,601 | 4/1969 | Dyre .......... | 317/61.5 |

*Primary Examiner*—Kathleen H. Claffy
*Assistant Examiner*—William A. Helvestine
*Attorney*—Kenway, Jenney and Hildreth

ABSTRACT: A telephone line is connected to local transmitting equipment through a protective device including an amplitude limiter. The amplitude limiter is effectively shunt-connected with the local equipment for the talking or transmitting mode, that is, when circuits are established for dialing or voice frequency, tone or pulsed data transmissions to the line, but not effectively shunt-connected for the ringing mode, that is, when circuits are established for bell operation on an incoming ringing signal.

INVENTOR.
WARREN G. BENDER
BY Kenway Jenney & Hildreth
ATTORNEYS

INVENTOR.
WARREN G. BENDER
BY Kenway Jenney & Hildreth
ATTORNEYS

INVENTOR.
WARREN G. BENDER
BY

ATTORNEYS

OVERVOLTAGE TRANSMISSION LINE PROTECTOR

BACKGROUND OF THE INVENTION

This application is a continuation-in-part of my copending application Ser. No. 777,860 filed Nov. 21, 1968, now abandoned. The field of this invention generally comprises devices intended to prevent hazardous or excessively high voltages being transmitted over a telephone line by equipment connected to it by a subscriber. The principal object of such devices is in contrast to that commonly associated with subscriber telephones, namely, the protection of local telephones from hazardous voltages on the line including those caused by lightning and accidental contact with power lines.

The necessity of protecting telephone lines from subscriber equipment operated at hazardous or excessive voltages is becoming increasingly evident with the development and use of new voice and nonvoice transmission devices. These include automatic dialers, alarm systems and other digital transmitters and facsimile devices as well as voice frequency transmitters producing higher peak signals than those for which the lines are primarily designed.

These voltages may be produced by subscriber-owned equipment either electrically connected to the line or acoustically coupled to it using a telephone set.

Adverse effects on a telephone transmission line include hazardous potentials, both AC and DC from wire to wire or between either wire and ground, as well as transmission degradation. The latter commonly takes the form of crosstalk which is the result of electrical or magnetic interaction in multipair cables or in switching systems. Another form of degradation results from overloading of multichannel carrier transmission systems, especially those which are designed to handle a limited total power based upon the statistical probability that only a small fraction of the total possible power will be contributed by all the channels at any time. In such systems, if a given transmitter is "blasted through," that is, operated substantially above the peak signal voltage appearing on other channels, it may degrade the signals on such other channels, even to the point of inoperativeness of all channels in an extreme case. While such operation of a given digital transmitter may sometimes be effective to increase its available bit rate, the adverse effect on other channels may be unwarranted, especially in the usual multisubscriber networks. To protect against signal degradation, it is generally desirable to limit signals to some value, certainly no more than about +2 dbm. (2 decibels with reference to 1 milliwatt).

In addition to limiting the voltages applied to the line, satisfactory protective equipment should be so designed as to permit normal telephone loop functions such as dialing and ringing, and also the routine testing of lines. Such tests include transmission tests, typically a 1,000 Hz., 0 dbm. tone applied at the central office, and line insulation tests typically designed to ascertain whether the line-to-line resistance is less than a given value, commonly about 20,000 ohms.

SUMMARY OF THE INVENTION

This invention features the use of a voltage limiter circuit such as that provided by one or more varistors, connected between the lines of the local subscriber during the talking or transmitting mode. This circuit clips voltage peaks of either polarity and prevents their transmission to the outgoing line. This connection is effectively disabled, however, during the ringing mode, as when the local telephone is on the hook, as well as during dialing. Disabling may be accomplished by contacts of a relay or by selective nonconduction in a series-connected semiconductor.

The protective device also has provision to limit the clipping function to desired frequency levels, for example those over 150 Hz.

The invention is further adapted to use in conjunction with conventional means for protection of local equipment from excessive voltages on the transmission lines. Such means include, for example, Zener diode circuits, arcing protectors of the carbon block or gas tube type, and fuses.

The forgoing functions are realized in a simple, low-cost unit suitable for installation at each user's end of the telephone line.

DESCRIPTION OF THE PREFERRED EMBODIMENT

Figure 1:
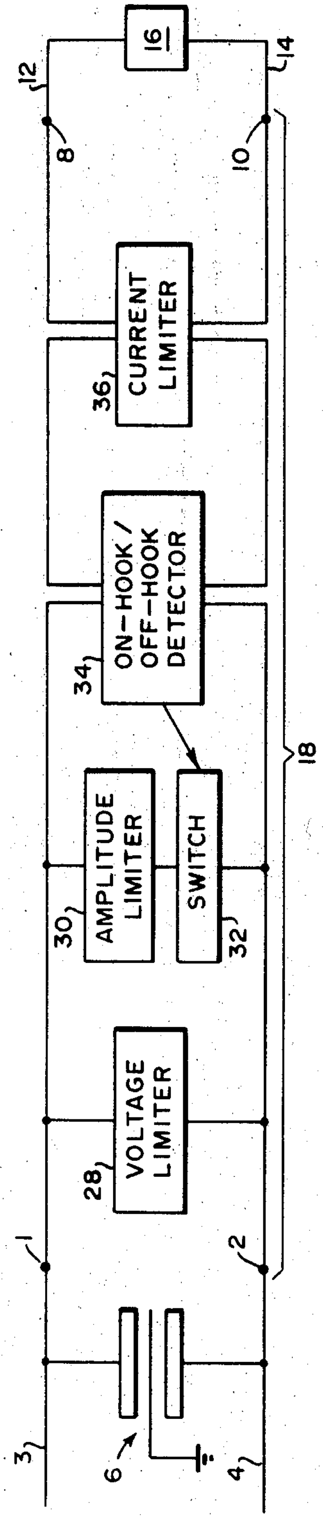
FIG. 1 is a block diagram of a preferred embodiment of the invention.

Referring to the drawings, terminals 1 and 2 represent entry terminations of a telephone transmission line pair 3, 4 extending to the central office. These lines are commonly but not necessarily balanced with respect to ground in the usual manner. The usual carbon block protector 6 is connected between the lines to protect local equipment from hazardous voltages on the line. Typically, it arcs over at about 600 volts. It will be evident that other devices of the usual form for protection of local equipment may also be employed. These devices do not interfere with operation of this invention, nor does this invention interfere with their operation.

Terminals 8 and 10 represent the terminations of house wires 12 and 14 leading to local equipment 16. Such equipment consists of the conventional subscriber telephone or telephones, together with any other equipment connected between the lines and in parallel with the telephone or telephones, such as digital pulse transmitters for automatic dialing, alarm signaling, or computer data transmission. Between the terminals 1, 2 and 8, 10 in each of the FIGS. is a protective circuit, generally designated 18 in FIG. 1, 20 in FIG. 2, 22 in FIG. 3, 24 in FIG. 4, 26 in FIG. 5 and 27 in FIG. 6. Each of these circuits is adapted for protection of the transmission lines from hazardous and excessive voltages produced at the terminals 8 and 10 by the local equipment. For convenience, it is generally desirable for each of these circuits to be housed in a single chassis provided with terminals marked 1, 2, 8 and 10 or other convenient designations, the chassis to be installed at the service entrance or mounted upon or adjacent to the local equipment, as desired.

The protective circuit 18 of FIG. 1 is shown in block diagram form and is generic to FIGS. 2 to 6. It includes a voltage limiter 28 which is continually operative to protect the lines 3 and 4 from excessive voltages by clipping them to a predetermined level. It also includes an amplitude limiter 30 which is under the control of a switch 32, the switch being operated by an on-hook/off-hook detector 34. The detector 34 is adapted to function by closing the switch when a telephone in the circuit 16 is off the hook, thereby effectively placing the amplitude limiter 30 across the lines. The detector is adapted to open the switch when there is no telephone off the hook in the circuit 16. The amplitude limiter 30 is therefore brought into effective operation only when the circuit 16 is in the transmitting mode, and its purpose is to limit the amplitude of the signals produced by the equipment 16.

A current limiter 36 is further provided to furnish added protection against voltage sources that might be connected across the terminals 8 and 10.

Details of specific forms of the foregoing circuit elements are described as follows.

In each of the five specific illustrated protective circuits, two Zener diode circuits 38 and 40 act as a voltage limiter and are preferably connected in parallel between lines 42 and 44, the latter being respectively connected to the terminals 1 and 2. The circuit 38 consists of four Zener diodes comprising two pairs each having two Zener diodes connected in opposition with respect to their Zener directions. The circuit 38 limits voltage between either of the lines 42 and 44 and ground to the Zener voltage, for example 130 volts. Similarly, the circuit 40 comprises two Zener diodes connected in opposition with respect to their Zener directions, and limits the line-to-line voltage to the Zener voltage. The operation of these circuits is well known and is briefly described as follows.

Each Zener diode is a silicon PN junction alloy diode, or any equivalent which presents a low impedance to current flow in one direction symbolized in the drawing by the arrow. It presents a relatively high impedance to current flow in the opposite direction when the applied voltage is less than a predetermined avalanche breakdown voltage, designated the Zener voltage. When the applied voltage in such opposite direction equals or tends to exceed the Zener voltage, the diode conducts and acts essentially as a constant voltage device at the level of the Zener voltage. It will be noted from the drawing that for any applied voltage polarity between the lines 42 and 44, or between either line and ground, the circuits 38 and 40 present a high impedance to the Zener voltage level but effectively clip the voltage to such level, thereby protecting the lines from excessive voltages. The Zener network 38, 40 is fast acting and is capable of clipping DC or pulsed voltages of long or short duration.

Each of the five illustrated protective circuits also has fuses 46 and 48 in the connections to the terminals 8 and 10. These fuses constitute a current limiter and provide protection to the transmission lines and the transmission protector in case of connection of high voltage sources to either of the latter terminals. Since currents in telephone lines are generally below 100 ma., the fuses are designed to pass this current, and in fact they are effective for this purpose even if rated at a substantially higher current, such as one-fourth ampere.

Figure 3:
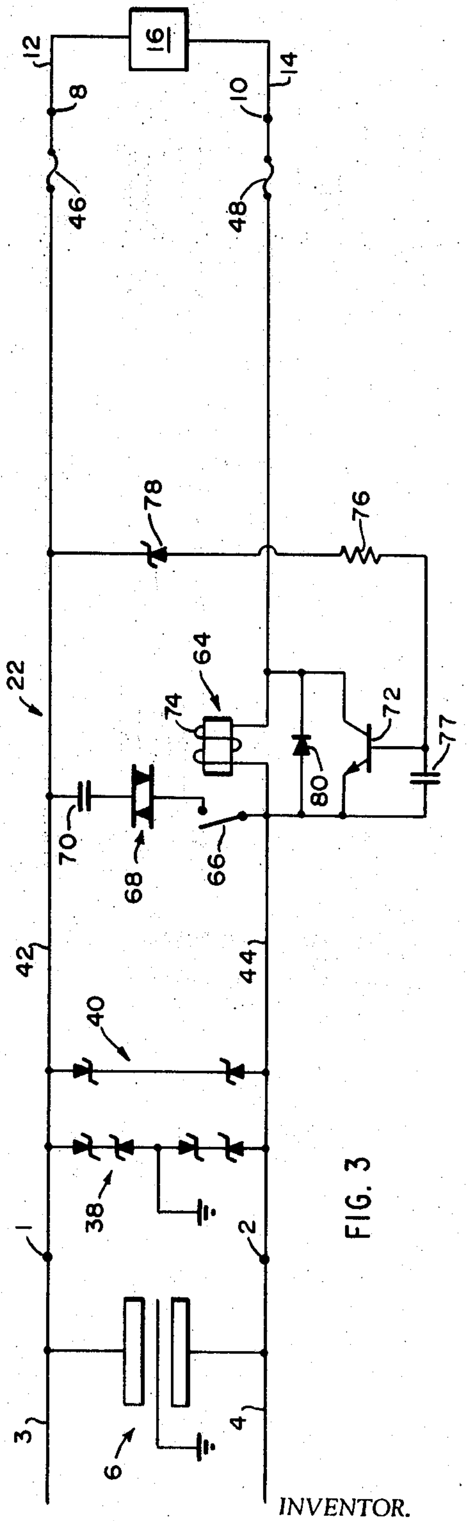
FIG. 3 is a schematic diagram illustrating a second form employing a faster acting relay.
Figure 4:
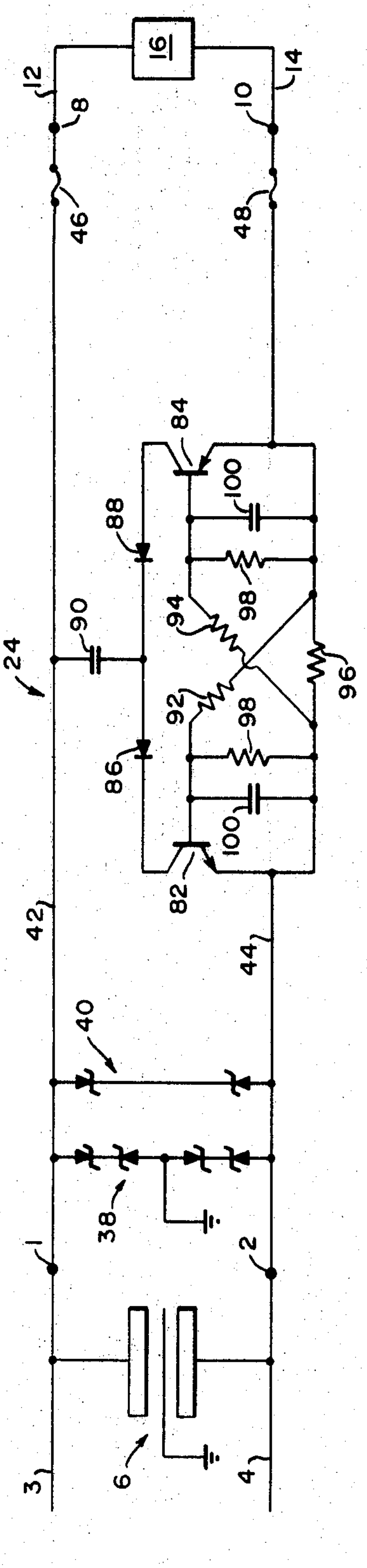
FIG. 4 is a schematic diagram of a third form having separate paths for clipping voltage peaks of opposite polarities.
Figure 5:
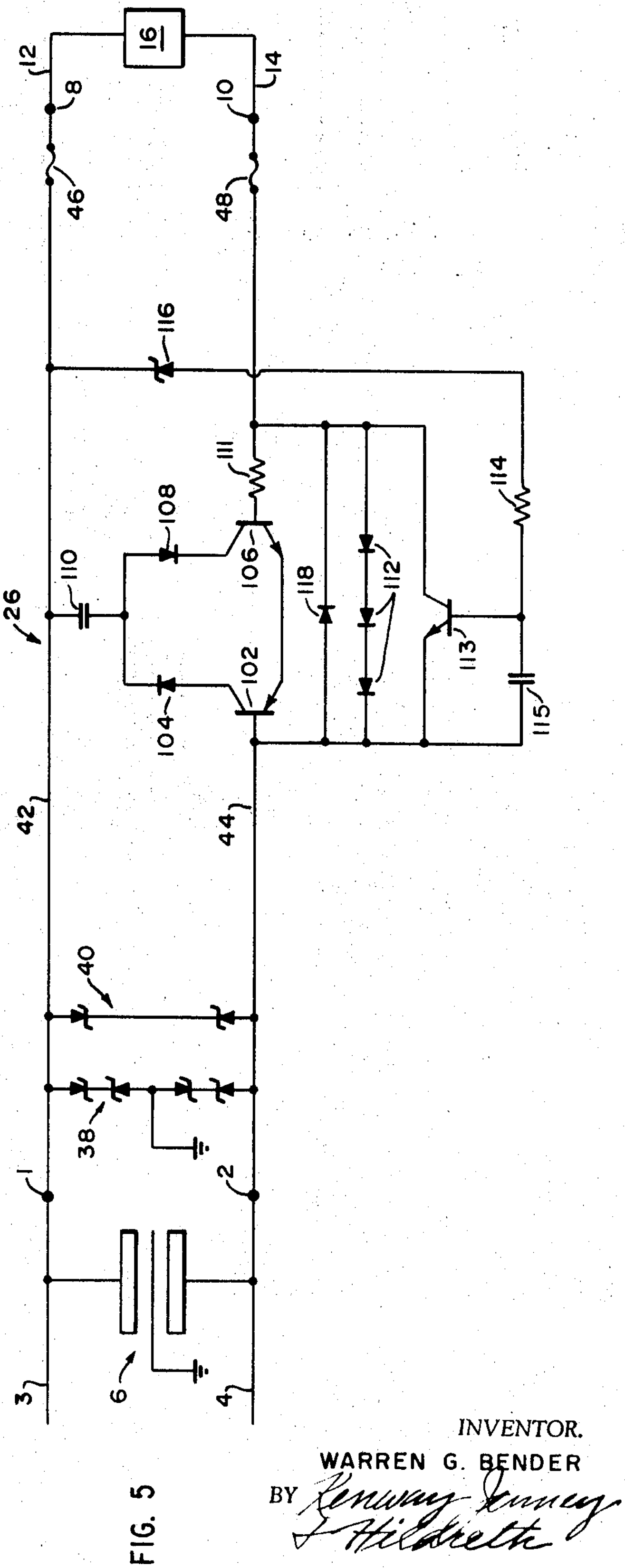
FIG. 5 is a schematic diagram of a fourth form having certain features common to those of FIGS. 2 and 3.

The above described circuits comprise elements common to all five specific forms illustrated in the drawing. The circuits described below, comprising the amplitude limiter, switch and on-hook/off-hook detector, differ in each form, but each circuit is a two-state device, inoperative during the ringing mode and operative during the talking or transmitting mode to clip excessive voltage peaks from signals applied between the terminals 8 and 10. The circuits of FIGS. 3 to 5 are intended to be connected to the line pair 3, 4 with a particular polarity, but the circuits of FIGS. 2 and 6 may be initially connected with either polarity, and will not be affected by changes in polarity during switching operations of the central office. For an understanding of these circuits, it is useful to note the circuit characteristics of the local equipment 16 in each of the ringing, dialing and talking modes. These characteristics are essentially the same as those of telephones in common use. They are well known and will only be briefly summarized.

When the telephone is on the hook, a DC voltage, commonly 48 volts, is present between the terminals 8 and 10. No DC current flows through the circuit 16. If a ringing signal is received, this comprises a series of pulses having a frequency between about 16 and 66 Hz. (typically about 20 to 30 Hz.), and an amplitude between about 60 and 150 volts r.m.s. (typically about 80 volts r.m.s.). At such frequency, the impedance of the circuit 16 is about 20,000 ohms including a series capacitance of about .25 mf., and an alternating current of about 4 ma. flows through and actuates the bell.

When the telephone is off the hook, the circuit 16 provides a path for a DC current typically of about 20 ma. and the DC voltage between the terminals 8 and 10 drops to a level substantially below 35 volts. This condition obtains throughout the talking mode, but may be interrupted by dialing. When the dial is moved away from its normal limit position, the circuit 16 becomes an open circuit which is shorted between the terminals 8 and 10 briefly during each dial pulse.

It will be observed that there are two circuit conditions imposed by the condition of the telephone circuit 16 that typify the ringing mode, namely, (1) the absence of direct current flowing through the lines 12 and 14, and (2) the presence of a DC voltage of at least 35 volts between these lines. The circuits of FIGS. 2 and 3 respond to condition (1) by deenergization of a relay having a coil winding in series with the lines. The circuits of FIGS. 4, 5 and 6 respond to condition (1) by means of a voltage drop corresponding to the direct current flow, the absence of which turns "off" a pair of transistors performing the function of the switch 32 in FIG. 1. The circuits of FIGS. 3, 5 and 6 respond also to condition (200) by providing a transistor which is biased "on" by a DC voltage of 35 volts or greater between the terminals 8 and 10, this transistor operating to disable the amplitude limiter means. In each of the circuits, means are provided to prevent ringing pulses from changing the inoperative state, but to allow a change to the operative state by removal of the telephone from the hook. The details of the respective circuits are further described below.

Figure 2:
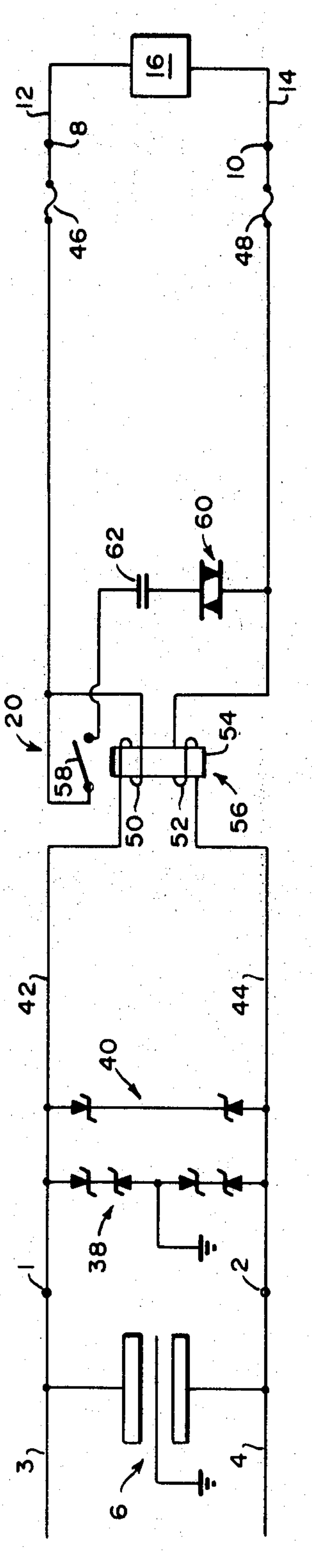
FIG. 2 is a schematic circuit diagram of one form of the invention employing a slow-acting relay with contacts for disabling the clipping circuit.

Referring to FIG. 2, the lines 42 and 44 are respectively connected to coils 50 and 52 wound in tandem about the core 54 of a slow-acting relay 56. The opposite terminations of these coils are connected through the fuses 46 and 48 to the house circuit.

Assuming that the local telephone is on the hook, the relay 56 is unenergized and its contacts 58 are open. Ringing pulses will be only slightly attenuated by the coils 50 and 52 whose impedances are low compared to that of the ringing bell. Thus the protective circuit does not interfere with the ringing mode.

The ringing current, typically about 4 ma. for each bell in the circuit 16, is insufficient to energize the relay 56 because the latter is insensitive to pulses of such short duration. Similarly, the relay is not energized by dialing pulses or by multiple-tone or pushbutton dialing.

When the local telephone is removed from the hook, a relay at the central office is energized to connect a DC source between the lines 3 and 4, this source producing a direct current typically of about 20 ma. which is sufficient to hold the connection at the central office in accord with prevailing common battery practice. This current is also sufficient to energize the relay 56 which holds as long as the telephone is off the hook.

The contacts 58 of the relay connect a series circuit between the lines, this circuit comprising varistors 60 and a capacitor 62. The varistors function as a clipping circuit that limits the peak-to-peak voltage to a predetermined level, typically about 2 volts, for voltages of either polarity applied by any transmitter that may be connected in parallel with the telephone between the lines 12 and 14. Thus signals above this level are clipped by shorting them between the lines 12 and 14, and the transmission lines 3 and 4 are protected from voltages above the peak levels for which they are designed. The capacitor 62 limits the operation of the varistors to AC and pulse signals of the type produced by pulse transmitters, the components of which are in the region above about 150 Hz. The capacitor thereby prevents the varistors from distorting dial pulses, which are ordinarily transmitted at about 10 per second.

Occasional speech peaks in excess of the clipping voltage of the varistors 60 may occur, but the clipping of these is not subjectively objectionable and does not interfere with intelligibility. This minor distortion is insignificant by comparison to distortion already present in the usual carbon granule telephone transmitters.

In the embodiment of FIG. 3, a relay 64 of ordinary sensitivity is used for the same function as the relay 56 in FIG. 2. When DC talking current flows, the relay is energized and its contacts 66 close a circuit including varistors 68 and a condenser 70, corresponding in function to the parts 60 and 62 in FIG. 2.

Circuit means are employed to prevent the relay 64 from being energized by ringing pulses. These means include a transistor 72 having its emitter and collector connected across the winding 74 of the relay, together with a resistor 76, a condenser 77 and a Zener diode 78. The Zener voltage is above the normal DC voltage between the terminals 8 and 10 during the talking mode, but below the normal DC voltage between these terminals in the ringing mode. A typical value is 35 volts.

When the local telephone is on the hook, the Zener diode 78 conducts. Assuming a DC line voltage of 48 volts, and a resistance 76 of about 12,000 ohms, DC current through this resistance from line-to-line is limited to about 1 milliampere; therefore, the circuit has an apparent resistance of about 48,000 ohms and does not interfere with line insulation tests.

The current from base to emitter of the transistor 72 permits conduction from collector to emitter, thereby forming a short circuit for the coil 74 for one polarity of ringing pulses. A short circuit for the opposite polarity is provided by a diode 80. Therefore, ringing pulses do not energize the relay. The condenser 77 prevents the ringing voltage which might interrupt the conduction in the Zener diode 78 from halting the flow of current to the base of the transistor 72.

When the local telephone is removed from the hook, the voltage across the terminals 8 and 10 decreases and the Zener diode 78 ceases to conduct, thereby preventing current from flowing from collector to emitter in the transistor. Assuming that the DC talking current is in opposition to the diode 80, it therefore flows through the coil 74 and energizes the relay.

The circuit of FIG. 4 employs two transistors 82 and 84 of opposite polarity (one PNP and one NPN), two corresponding diodes 86 and 88, and a condenser 90, which collectively function in a manner similar to the contacts 58, the varistors 60 and the condenser 62 in FIG. 2. These transistors are biased "off" in the ringing mode and carry current between collector and emitter in the talking mode, thus enabling the diode 86 to clip one polarity of pulses between the terminals 8 and 10, and the diode 88 to clip the opposite polarity. The bias circuits for the transistors comprise resistors 92, 94 and 96.

When the local telephone is on the hook, no current flows in the resistor 96, hence, there is no voltage or current between base and emitter in either transistor. This, in effect, switches "off" the circuits between the collectors and emitters. When the local telephone is removed from the hook, a DC current of 20 ma. or more flows in the resistor 96. Typically, this resistor may be about 50 ohms, and the resulting voltage drop of about 1 volt is properly connected to cause conduction between the respective emitters and bases of the transistors, these currents passing through the resistors 92 and 94. This switches "on" the clipping circuits by permitting conduction between the collectors and emitters.

Ringing pulses also produce a voltage drop across the resistor 96, but these pulses are short-circuited between the emitters and bases by circuits comprising resistors 98 and condensers 100, and do not turn on the transistors. To this end, the time constants of these circuits are such that the condensers 100 rapidly lose their charge after each ringing pulse.

The circuit of FIG. 5 is similar to that of FIG. 4 in that it has two clipping circuits of opposite polarity, one comprising a transistor 102 and a diode 104 and the other comprising a transistor 106 and a diode 108, both operating in conjunction with a condenser 110. As in the FIG. 4 embodiment, the transistors 102 and 106 are biased "off" in the ringing mode. In the talking mode, DC current flows through a bias resistor 111 and through the base emitter connections of the transistors 102 and 106, and also through a parallel circuit comprising three diodes 112. This permits conduction among the collectors, emitters and bases, thus enabling the diode 104 to clip one polarity of pulses across the terminals 8 and 10, and the diode 108 to clip the opposite polarity. With normal talking current, the voltage drop through the three diodes 112 is therefore large enough to turn "on" the two base-emitter junctions in the transistors 102 and 106, causing the collector-base and base-emitter junctions of these transistors to be "on."

However, the circuit of FIG. 5 employs the means of FIG. 3 to bias the transistors "off" in the ringing mode. These means include a transistor 113, a resistor 114 which may be of the same value as the resistance 76, a condenser 115 and a Zener diode 116. When the local telephone is on the hook, no DC current flows in the bias resistor 111, and therefore the transistors 102 and 106 are biased "off." Also, the DC voltage across the terminals 8 and 10 exceeds the Zener voltage, which is preferably of the same value as that of the Zener diode 78, and the diode 116 therefore conducts. The current through the base-emitter junction of the transistor 113 permits conduction between the collector and emitter. This forms a shunt circuit for one polarity of current around the circuit comprising the resistor 111 and the transistors 102 and 106. A short circuit for the opposite polarity is provided by a diode 118, which is comparable in function to the diode 80 in FIG. 3. Therefore, ringing pulses do not bias "on" the transistors 102 and 106. The condenser 115 prevents the ringing voltage which might interrupt the conduction in the Zener diode 116 from halting the flow of current to the base of the transistor 113.

The circuits of FIGS. 1 to 5 are not required to provide a clipping function during the transmission of dial pulses. Dialing involves the alternate short circuit and open circuit of the terminals 8 and 10 by contacts in the circuit of the local telephone.

The relay 56 in FIG. 2 is not responsive to the frequency of dial pulses, typically about 10 Hz. This relay, which is energized by lifting the telephone from the hook, may become temporarily deenergized during dialing, thereby opening the clipping circuit. But this is of no material consequence since no pulses are being applied by local equipment between the terminals 8 and 10 during dialing. In any case, the relay is promptly reenergized upon the return of the dial to its limit position.

Likewise, the relay 74 in FIG. 3 becomes deenergized in open-circuit intervals during dialing, but is promptly reenergized when dialing is completed. Similarly, the current in the resistor 96 of FIG. 4 is interrupted during the open circuit dialing intervals, thereby biasing "off" the clipping circuits, but this current is restored when the talking current is resumed. In FIG. 5 an analogous inconsequential interruption occurs in the emitter-base current in the transistors 102 and 106 during the open circuit intervals of dialing.

The circuits of FIGS. 3 to 5 require a particular polarity of connection to the lines 3 and 4 depending on the polarity of the common battery. In each of these circuits the line 3 is positive with respect to the line 4. With this connection in FIG. 3, the DC talking current will not be shunted around the winding 74 by the diode 80. Likewise, in FIG. 4 the voltage drop produced by talking current passing through the resistor 96 will have the correct polarity to bias "on" the current limiting transistors. In FIG. 5, this connection will also the correct polarity to bias "on" the transistors 102 and 106. In some cases it may be desired to provide circuits that are bipolar, that is, operable for either polarity of connection to the lines 3 and 4. This allows the circuit to be installed initially without regard to polarity, and also allows it to continue to be operative in cases where the central office reverses the polarity during the progress of a call. This may be accomplished by connecting duplicates of any of the circuits 22, 24 and 26 to the lines 42 and 44 with polarities reversed with respect to those shown in the drawing. With this arrangement either the circuits shown or the duplicates so connected will be operative during the talking mode, depending on the polarity of the input connections.

In practice, the use of oppositely connected duplicate circuits may permit the elimination of certain redundant common circuit elements, whereby the total number of circuit parameters or elements is less than twice the number for the unipolar circuits shown.

Figure 6:
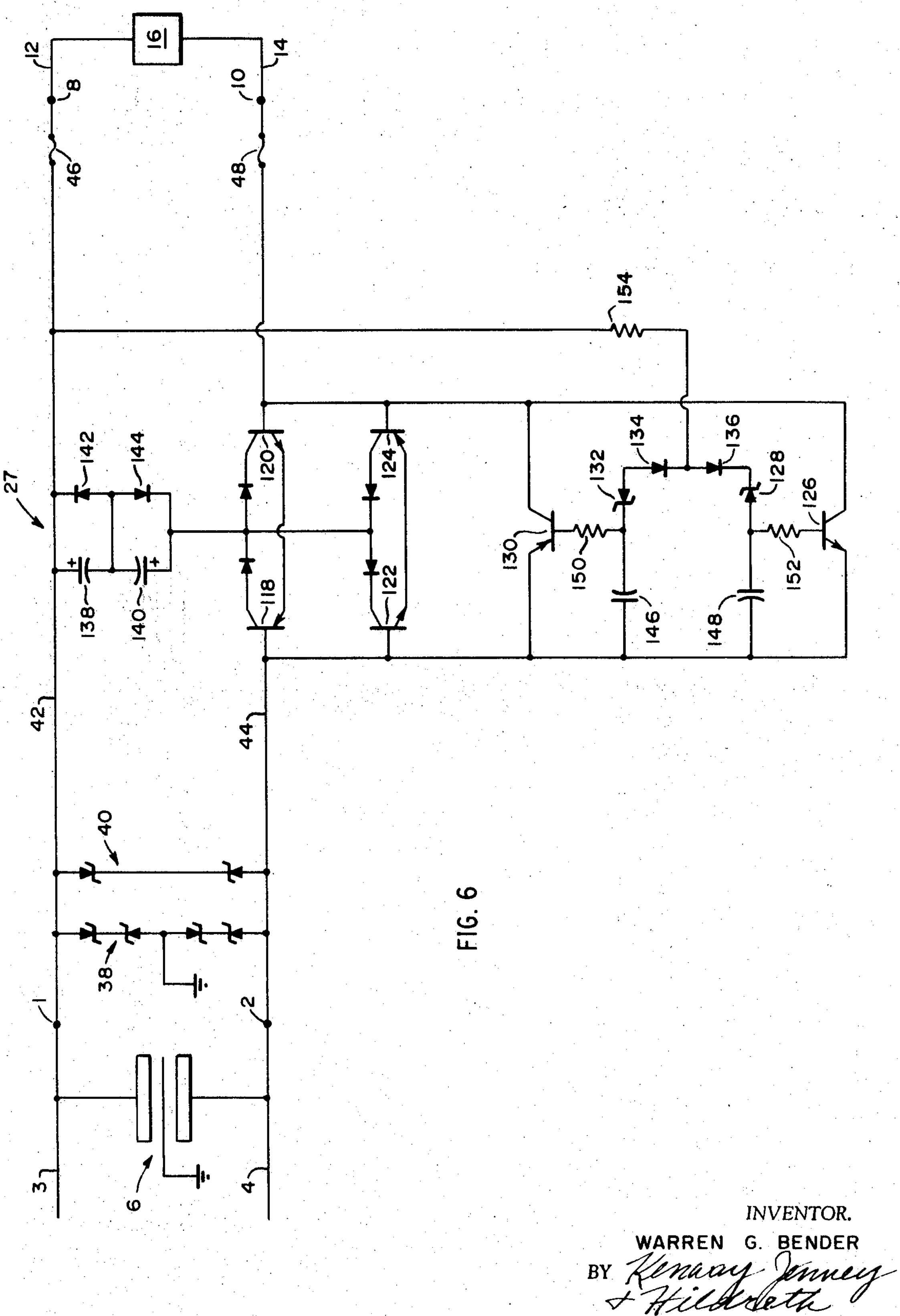
FIG. 6 is a schematic diagram of a fifth and preferred form that may be connected with either polarity to the transmission lines.

FIG. 6 shows the presently preferred form of bipolar circuit. This circuit has the basic features of FIG. 5 except for bipolarity. Transistors 118 and 120 operate as current limiters like the transistors 102 and 106 of FIG. 5 when the common battery polarity is the same as in FIG. 5, and transistors 122 and 124 operate similarly when the common battery is reversed.

Likewise, a transistor 126 and its associated Zener diode 128 operate like the transistor 113 and Zener diode 116 of FIG. 5 to shunt the transistors 118 and 120 during the ringing mode when the common battery polarity is the same as in FIG. 5. A transistor 130 and its associated Zener diode 132 operate similarly when the common battery is reversed. Diodes 134 and 136 block conduction in these transistors for the common battery connections in which they are respectively inoperative.

Electrolytic condensers 138 and 140 perform a function analogous to the condenser 110 in FIG. 5. These condensers are associated with parallel-connected protective diodes 142 and 144 adapted to shunt them in their respective back-bias directions. Thus the condenser 140 is shunted when the common battery connection makes the line 3 positive with respect to the line 4, and the condenser 138 is shunted when the connection is reversed.

Electrolytic condensers 146 and 148 with current-limiting resistors 150 and 152 are connected in the base-emitter circuits of the transistors 130 and 126. They operate to sustain current in these circuits to hold the transistors "on" during the ringing mode in case the ringing pulses should temporarily interrupt conduction in the Zener diodes 132 and 128, respectively. Also the resistors 150 and 152, together with the Zener diodes 132 and 128 and the diodes 134 and 136, isolate the bases of the transistors 130 and 126 from one another and prevent a "sneak path" from the collector of either transistor to the emitter of the other.

A resistor 154, together with the resistors 150 and 152, also has a current limiting function like that of the resistor 76 in FIG. 3.

Although only a particular bipolar version of FIG. 5 has been illustrated, it will be apparent that the circuit of FIG. 6 can be varied with respect to various details in accordance with well-known design considerations and component specifications.

For example, the transistor pairs 118, 120 and 122, 124 are connected in parallel because each is biased "off" when the other is "on." As an alternative, these pairs could be placed in series in the line 44 provided that each pair is shunted by a diode connected so that its forward direction carries talking current that biases "on" the opposite pair. Likewise, it will be evident that the other illustrated unipolar embodiments may have plural bipolar versions, or other forms and adaptations to accomplish the functions and modes of operation described above, without departing from the spirit or scope of the invention.

I claim:

1. A circuit for connecting a telephone line to a transmitting party station of the type that is nonconducting in the on-hook condition to a direct current voltage applied between two terminals thereof connected to said line, and conductive to a direct talking current in the off-hook condition, having the combination of:

a signal amplitude limiter;

circuit means operable to provide a path through said limiter between said terminals;

and a detector responsive to said off-hook condition to operate said circuit means.

2. The combination according to claim 1, in which the detector is responsive to the flow of talking current through said party station.

3. The combination according to claim 2, in which the detector includes a direct current conductive impedance and circuit means responsive to direct current flowing in said impedance.

4. The combination according to claim 1, in which the detector is nonresponsive to alternating current ringing signals.

5. The combination according to claim 1, in which the detector is frequency discriminating and nonresponsive to alternating current ringing signals in a range below that of transmission by said station.

6. The combination according to claim 1, in which the detector has disabling means having two stable conditions respectively attained by differing amplitudes of direct current voltage appearing between said terminals.

7. The combination according to claim 1, in which said detector includes a relay and said circuit means include contacts of said relay.

8. The combination according to claim 7, in which said relay has an operating coil in series connection between said party station and the telephone line.

9. The combination according to claim 8, in which the relay is slow-acting and nonresponsive to alternating current ringing signals in a range below that of transmission by said station.

10. The combination according to claim 8, having a shunt connection around said operating coil and means responsive to the on-hook condition to cause said shunt connection to conduct alternating current ringing signals.

11. The combination according to claim 8, having a shunt connection around said operating coil, and means having two stable conditions respectively attained by two differing amplitudes of direct current voltage appearing between said terminals and responsive to the higher of said amplitudes to cause said shunt connection to conduct alternating current ringing signals.

12. The combination according to claim 11, in which the shunt connection includes a transistor.

13. The combination according to claim 11, in which the shunt connection includes a transistor having a bias circuit connected between said terminals.

14. The combination according to claim 13, in which the bias circuit includes a Zener diode having a breakdown voltage between said two amplitudes.

15. The combination according to claim 1, in which the signal amplitude limiter includes varistors.

16. The combination according to claim 1, in which the signal amplitude limiter includes varistors in series with a capacitor.

17. The combination according to claim 1, in which the signal amplitude limiter includes plural parallel and reversely connected unidirectional amplitude clipping elements.

18. The combination according to claim 1, in which the signal amplitude limiter includes two circuits for each including a diode, the circuit means having a switching element in each of said two last-mentioned circuits.

19. The combination according to claim 18, in which the switching elements are transistors.

20. The combination according to claim 18, in which the switching elements are transistors, said transistors having bias circuits including a common impedance in series connection between said party station and the telephone line.

21. The combination according to claim 1, in which the detector operates the circuit means when direct talking current flows through the party station in either direction.

22. The combination according to claim 1, in which the detector includes two direct current conductive circuits each responsive to direct current flowing in a distinct direction through the party station.

23. The combination according to claim 22, in which each of the direct current conductive circuits has disabling means having two stable conditions respectively attained by differing amplitudes of direct current voltage appearing between said terminals, one of said stable conditions producing a shunt around its direct current conductive circuit during the on-hook condition.

PO-1050
(5/69)

UNITED STATES PATENT OFFICE
CERTIFICATE OF CORRECTION

Patent No. 3,558,830 Dated January 26, 1971

Inventor(s) Warren G. Bender

It is certified that error appears in the above-identified patent and that said Letters Patent are hereby corrected as shown below:

Column 4, line 12, cancel "(200)" and substitute --(2)--

Signed and sealed this 10th day of August 1971.

(SEAL)
Attest:

EDWARD M.FLETCHER,JR.
Attesting Officer

WILLIAM E. SCHUYLER, JR.
Commissioner of Patents